(12) United States Patent
Rios

(10) Patent No.: US 12,190,851 B2
(45) Date of Patent: Jan. 7, 2025

(54) AUDIO GENERATION METHODS AND SYSTEMS

(71) Applicant: Sony Interactive Entertainment Europe Limited, London (GB)

(72) Inventor: Adrian Barahona Rios, London (GB)

(73) Assignee: Sony Interactive Entertainment Europe Limited (GB)

( * ) Notice: Subject to any disclaimer, the term of this patent is extended or adjusted under 35 U.S.C. 154(b) by 238 days.

(21) Appl. No.: 17/865,869

(22) Filed: Jul. 15, 2022

(65) Prior Publication Data

US 2023/0018661 A1 Jan. 19, 2023

(30) Foreign Application Priority Data

Jul. 16, 2021 (GB) ...................................... 2110280

(51) Int. Cl.
*G10H 1/00* (2006.01)
*A63F 13/54* (2014.01)

(52) U.S. Cl.
CPC .......... *G10H 1/0008* (2013.01); *A63F 13/54* (2014.09); *G10H 2220/135* (2013.01); *G10H 2250/235* (2013.01); *G10H 2250/311* (2013.01)

(58) Field of Classification Search
None
See application file for complete search history.

(56) References Cited

U.S. PATENT DOCUMENTS 10,511,908 B1 12/2019 Fisher
2019/0392802 A1* 12/2019 Higurashi .............. G06N 20/00
2022/0319534 A1* 10/2022 Krishnan Gorumkonda ...............
G10L 25/51

FOREIGN PATENT DOCUMENTS

JP 2019139102 A 8/2019
KR 20200132352 A 11/2020

OTHER PUBLICATIONS

Extended European Search Report including Written Opinion for Application No. 22183615.8 dated Dec. 9, 2022, pp. 1-12.
Huzaifah, M. et al., "Applying Visual Domain Style Transfer and Texture Synthesis Techniques to Audio—Insights and Challenges", arxiv.org, Cornell University Library, Jan. 29, 2019 (Jan. 29, 2019), pp. 1-15. XP081009556.
Hiwang, Y. et al., "Mel-spectrogram augmentation for sequence to sequence voice conversion", arxiv.org, Cornell University Library, Jan. 6, 2020 (Jan. 6, 2020), pp. 1-5. XP081572541.
Vainer, J. et al., "SpeedySpeech: Efficient Neural Speech Synthesis", arxiv.org, Cornell University Library, Aug. 9, 2020 (Aug. 9, 2020), pp. 1-5. XP081737392.

(Continued)

*Primary Examiner* — Hemant S Patel
(74) *Attorney, Agent, or Firm* — Lerner David LLP

(57) ABSTRACT

A method of generating audio assets, comprising the steps of: receiving an input audio asset having a first duration, generating an input image representative of the input audio asset, training a generative model on the input image and implementing the trained generative model to generate an output image representative of an output audio asset having a second duration different to the first duration, and generating the output audio asset based on the output image.

13 Claims, 4 Drawing Sheets

(56) References Cited

OTHER PUBLICATIONS

Zhang, T. et al., "Learning long-term filter banks for audio source separation and audio scene classification", EURASIP Journal on Audio, Speech, and Music Processing, May 30, 2018 (May 30, 2018), pp. 1-13, vol. 2018. XP021256902.
Examination Report for Appln. No. GB2110280.1 dated Sep. 11, 2023, pp. 1-4.
Combined Search and Examination Report for GB Application No. GB2110280.1 mailed Jan. 17, 2022, pp. 1-7.

\* cited by examiner

AUDIO GENERATION METHODS AND SYSTEMS

CROSS-REFERENCES TO RELATED APPLICATIONS

The present application claims priority Great Britain Patent Application No. 2110280.1, filed on Jul. 16, 2021, the disclosure of which is hereby incorporated herein by reference.

BACKGROUND OF THE INVENTION

Field of the Invention

The present invention relates to methods and systems for generating audio, for example audio assets for use in a video game environment.

Description of the Prior Art

With the growing size of current games, audio content generation is a challenging task. Sound designers are required to produce an ever-growing variety of sounds and audio assets for each game. For example, in the field of video games, a huge library of audio assets for sound effects is needed particularly for expressing sound effects. In many situations it is desirable to have various similar sounds or audio assets which have the same or similar overall feel but which differ in some aspect such as the time duration. These variations may replicate certain factors which would influence acoustic characteristics (such as volume, pitch, tone, timbre) of the sound due to in-game actions, conditions, or events. In creating such sounds, each such asset typically needs to be manually crafted to have the suitable variations from the base audio asset. This is often time-consuming, expensive (both computationally and financially) and places a heavy intellectual burden on the audio creator.

Furthermore, in certain applications (such as in video games), it is advantageous to be able to generate new audio assets on the fly. Such a process is difficult to implement because the audio cannot be generated by a sound engineer post release of the game and must be generated by means of a computer process. In such cases it is often difficult to generate audio assets which have the required variation from the original asset, but which are still similar enough in overall theme to the original asset that the audience can recognise them as such. Attempts at providing computation audio asset generation have been made but they are often complex and process intensive, resulting in a slow and expensive process. Such computational solutions are also often single output meaning that each new audio asset must be generated one-by-one, which further increases time and processing costs.

The present invention seeks to mitigate at least some of the above problems.

SUMMARY OF THE INVENTION

According to an aspect of the disclosure, there is provided a method of generating audio assets, comprising the steps of: receiving an input audio asset having a first duration, generating an input image representative of the input audio asset, training a generative model on the input image and implementing the trained generative model to generate an output image representative of an output audio asset having a second duration different to the first duration, and generating the output audio asset based on the output image.

Using a graphical representation of audio (such as spectrograms) to train generative models allows the generation of audio assets with relative ease and autonomy, particularly when it is desirable to generate similar audio assets of different lengths (in time).

Typically, the input image and output image may each comprise an axis representative of time duration. That is to say that the image representations used in the present invention may represent the time duration of the audio to which it relates by at least one dimension of the image. For example, the horizontal axis of the image may represent time elapsed, running from zero at the origin to the total duration of the audio asset. The step of generating an output image may comprise retargeting the input image along the axis representative of time duration of the audio asset. Retargeting is a technique used with generative networks that allows the production of new images from the training image with different aspect ratios and/or dimensions whilst preserving salient regions in the training image. Such a technique allows the generation of new images from which audio assets of different time durations can be derived, whilst maintaining some of the key features of the sounds in the input audio asset.

In some examples, the image may be retargeted to have a larger dimension or aspect ratio along the time axis. For example, when the input image is an input spectrogram having a time dimension along its horizontal axis, the spectrogram may be retargeted to be wider along that axis. In other examples, the image may be retargeted to have smaller dimension or aspect ratio along the time axis, meaning that an input spectrogram would be retargeted to be narrower along that axis. In some examples, the generative model may be implemented to adjust the length or width along a combination of axes. The amount by which the image is retargeted may be defined by a scale factor representing the number of multiples the output image is along the time axis with respect to the input image. For example, a scale factor of 3 would represent an output image that is three times wider along the time axis than the input image. The scale factor may in some cases be representative of the multiplicity of the time duration of the output sound, such that for the above sound, a scale factor of 3 leads not only to an output image that is three times wider, but to an output audio asset that is three times longer in duration to the input audio asset. The scale factor may be random, or may be input to specifically control the output of the generative model. The scale factor may be part of a signal from another process, such as a video game environment.

Preferably, the generative model is a single-image generative model. Single image generation using spectrograms to make new sounds significantly reduces the amount of data and computational power needed compared to other generative models. Single-image generative models are trained on a single input image to generate novel variations of the input image. This is normally achieved by using a fully convolutional discriminator with a limited receptive field (e.g. a patch discriminator) and a progressively growing architecture. One of the pragmatic problems these single image models have is that they must be trained each time a new image is to be generated. In other words, if it is desired to produce novel versions of two different images, two different models must be trained (one per image). This is normally time consuming and expensive to operate and maintain. The present invention allows the generation of new audio assets in a short time by using a novel approach to create different time durations. In this way, it is possible to train single-image generative models on a single-channel graphical representation, for example, and have a single model that is able to produce variations of the input sound at different durations. This allows a large number of a new and detailed audio assets to be generated with ease and relatively little computational power required.

The present invention may utilise any of a number of different types of image or graphical representation of audio assets. For example, the audio assets may also be converted to or from audio waveform representation, or spectrograph representation. Preferably, the audio assets are converted to and from audio spectrograms. In such a case, the step of generating an input image may comprise performing a Fourier transform on each audio asset and plotting the frequency domain amplitudes in a graphical representation to produce a spectrogram. Spectrograms are advantageous because they represent the audio asset in a frequency space which displays characteristic information about the sound. A single spectrogram can represent monophonic audio for example and may be obtained by taking a short-time Fourier transform of the audio. The spectrogram will usually have one channel (if using the magnitude or the complex representation) or two channels (if using magnitude and phase). It has been found that one-channel spectrograms provide a particularly good representation of audio in the frequency domain which can be used to quickly and efficiently convert between graphical and acoustic representation of the audio asset, without significant loss in detail. Multiple channels may also be used when working with multi-channel audio, for example when working with stereo or ambisonics and 3D audio.

Whilst spectrograms are typically obtained and resolved through Fourier transforms (and the relevant inverse transforms), any suitable function may be used for conversion to and from spectrogram representation.

The single-image generative model may be a generative adversarial network, GAN, having a patch discriminator. A patch discriminator may be a type of discriminator for GANs which only discriminates loss for structure at the scale of local image patches, and classifies whether each patch in an input image is true or fake. The patch discriminator may be run convolutionally across the image, averaging all responses to provide the ultimate output of the discriminator. In case such a GAN is used, the step of generating one or more output multi-channel images may comprise training the GAN on the input multi-channel image.

The techniques described herein may be particularly suitable for use in a video game application, where a vast number of audio assets are required and a large number of similar sounds with slight variation is particularly advantageous. The step of receiving an input audio asset may comprise receiving, from a video game environment, video game information, and the step of generating the output image may comprise feeding the video game information into the single-image generative model such that the output image is influenced by the video game information. Whilst the input audio asset may be chosen beforehand (e.g., by sound designers) and the generative model trained on such pre-selected audio, the trained model could for example be stored on a memory and used multiple times to generate a large number of related audio assets. In producing such assets, the model may take information from video game environments and effect the generation of new images accordingly. For example, it may be desirable to generate new audio assets in response to changes in the video game environment. The amount, or scale factor, by which each new audio asset should vary from the training asset can be fed in directly from the video game environment to the generative model. This provides a seamless way to implement a generative model that need only be trained on one image once and which can be used repeatedly to generate multiple new assets.

In some examples, the input audio assets may be directly received from a microphone input. That is, the step of receiving a plurality of input audio assets may comprise receiving, from a microphone source, input audio clips.

According to a further aspect of the disclosure there is provided a computer program comprising computer-implemented instructions that, when run on a computer, cause the computer to implement the method according to the first aspect, with any one or more of the features disclosed herein.

It will be appreciated that the methods described herein may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

According to a further aspect of the disclosure there is provided a system for generating audio assets, the system comprising: an asset input unit configured to receive an input audio asset having a first duration, and to convert the input audio asset into an input image, and an image generation unit configured to implement a generative model to generate one or more output images based on the input image, the output image representing an output audio asset having a second duration different to the first duration, and an asset output unit configured to generate an output audio asset based on the output image.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
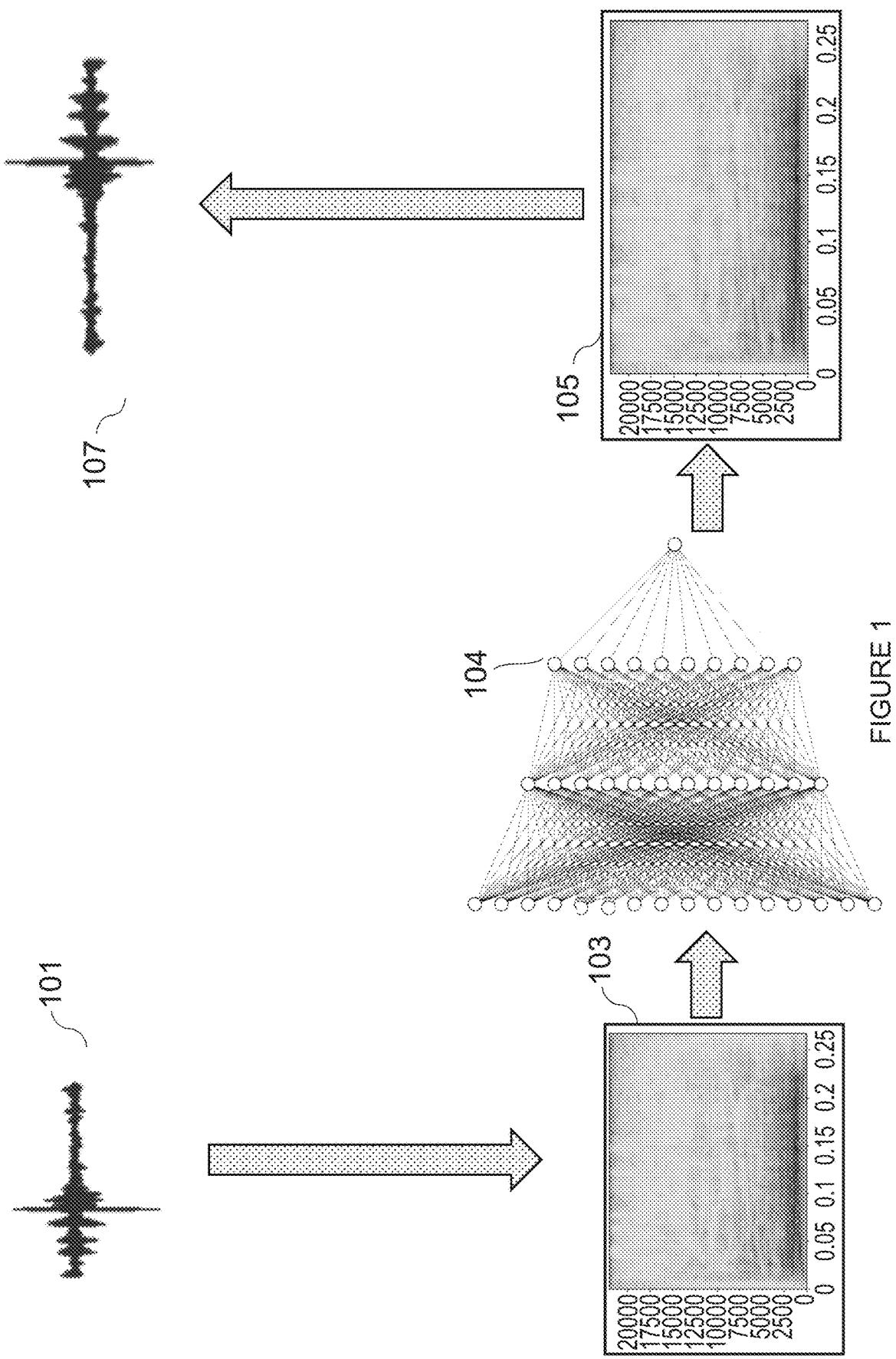
FIG. 1 schematically illustrates an example workflow of batch generation of audio files.

Referring now to the drawings, wherein like reference numerals designate identical or corresponding parts throughout the several views, the present invention provides a method for effectively and efficiently producing new audio assets. The technique generally involves receiving an audio clip, converting the audio clip into a graphical representation (an image representative of the audio clip) such as a spectrogram form, training a generative model on that spectrogram to generate new variant spectrograms and converting the new variant spectrograms into new audio assets. The general approach is illustrated schematically in FIG. 1, which outlines how an input audio file 101 having a first time duration is converted into an input spectrogram 103, passed into a neural network 104 which is trained on the input spectrogram, and then implemented to generate a new output image 105 which is a new spectrogram differing in at least one dimension to the input spectrogram 103, after which the output image 105 is converted into a new audio file 107 having a second time duration different to the first time duration of the input audio asset. As shown schematically in FIG. 1, the process takes in an audio sample 101 and outputs a new audio file 107 which is generally different in time duration (or length) to the input file 101.

Figure 2:
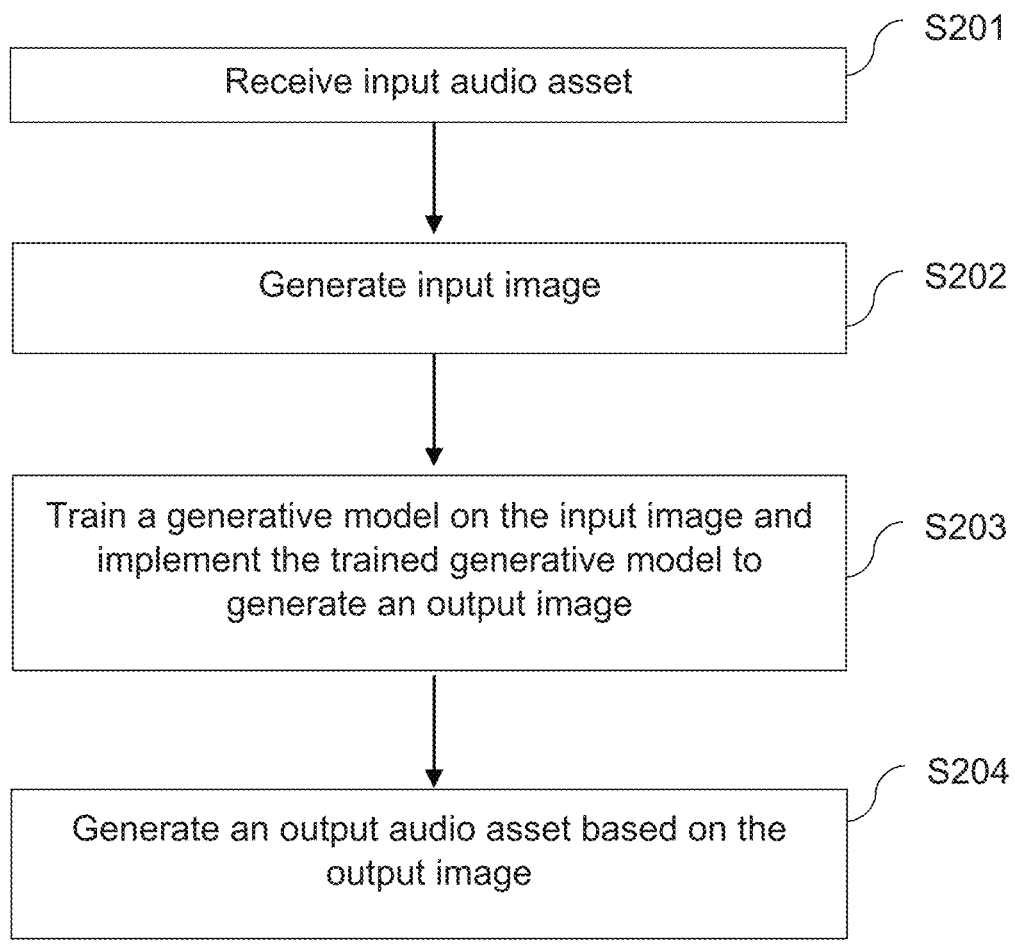
FIG. 2 schematically illustrates an example flow diagram of a method in accordance with an aspect of the disclosure.

An aspect of the present disclosure is a method for generating an audio asset. A flowchart of an exemplary method is shown in FIG. 2, wherein the method includes the following steps.

Step 201: Receive Input Audio Asset.

In a first step, the input audio asset is received to be processed. The input audio asset can be received on its own or as a group or batch. The input audio asset may be received by the processor which is handling the method and the generation of the new audio asset. The input asset may also be received by a memory to which such a processor has access, such that the processor can retrieve the audio asset when desired.

An input audio asset is an audio asset which forms the basis for generating new audio assets through the generative techniques described herein. That is, the asset on which the generative model is to be trained. The method is typically employed to generate new audio assets which are recognisable variants of the (or each) input asset, although in some other examples the method may generate new assets which are unrecognisably different to the input audio asset(s). The variation and variability of the output from the input assets can be controllable by the user. For example, at this step the method can also comprise receiving input control information for controlling the output of the method. Such information can be used when implementing an already trained generative network or alternatively be used for training the network. One parameter in the input control information could be a variability value which is read by the processor performing the method to alter the extent to which the output audio files differ from the input files. The variability value could relate specifically to one or more of the tone, frequency, length, pitch, timbre, tempo, roughness, loudness and brightness of the output sound. The input control information could also comprise one or more control sound files, such that the generative model is made to produce new sounds which have a distinct influence from the control sound files. For example, the input audio may have a first tempo, and a control sound file having a second tempo of for example 100 bpm is input with the control information, such that the output is similar to the input file but have the second tempo of 100 bpm. When the method is performed in a video game application, the input control information can be received from a video game environment or derived from one or more events in the video game. The video game information can be separate to, or constitute a whole or part of, the input control information. The various control information described herein can also be input to a pre-trained system. For example, a generative model trained on a single-image without control can be saved for later use, and when the trained model is accessed and implemented to generate new images, the control image can be input as an input noise vector or other constraining factor so as to affect the generation through the generative model.

The input audio asset has a duration in time, which is normally defined as the length of elapsed time between the first and last sound signals. When receiving the audio asset, metadata relating to the asset can be received at the same time and recorded. In some examples the metadata can be used in later steps for example to alter the way in which the generation step 203 is conducted. The metadata may contain information about the duration of the audio asset. Alternatively, when an audio clip is received in this step, its duration can be measured or checked.

The input audio asset can be selected for example from a pre-determined library of sounds, to generate a particular output or set of outputs. The input audio asset can be selected, for example, from a pre-determined library of multi-layered sounds. The selection of the particular audio asset to be input into the method can be made based on one or more of a number of selection criteria. For example, a vast library of available audio assets may be accessed and a subset may be selected based on a set of requirements (e.g., a desired ambience, volume level, pitch, time duration). Alternatively, the input audio assets may themselves be randomly generated by a procedural or generative method. The selection from a library or database of audio assets can be made according to an input from another process. In a video game application, an object or player in the video game environment may trigger an event, and that event may output a signal that can be received and used for the selection of the input audio asset. In some examples, the number of audio assets in the plurality of input assets may be controlled by the signal associated with the in-game event.

In some examples, the input audio asset can be received directly from an external input such as a microphone. The asset may be received in real-time: that is to say that the input audio asset may be received and processed using the method on the fly to return the output audio files. The generative network could for example be trained in the next step as a background process. Where multiple audio assets are received in this step, typically, each of the audio assets in the plurality are different to each other. However, in some examples, one or more of the audio assets can be a duplicate file. The multiple audio assets may be received or selected separately, or as part of an input multi-layered audio asset.

Step 202: Generate Input Image.

In this step, the sounds in the input audio asset are converted into an image as a graphical representation of the audio.

By 'image' or 'graphical representation' it is intended to mean a visual form of data which records and characterises the features of the respective audio asset, preferably without loss in the audio information. In other words, the audio asset is converted into a form in which the acoustic characteristics of the asset is recorded in visual form, from which an inversion can be made to convert the visual form back into an audio form to retrieve the original sounds.

Figure 3:
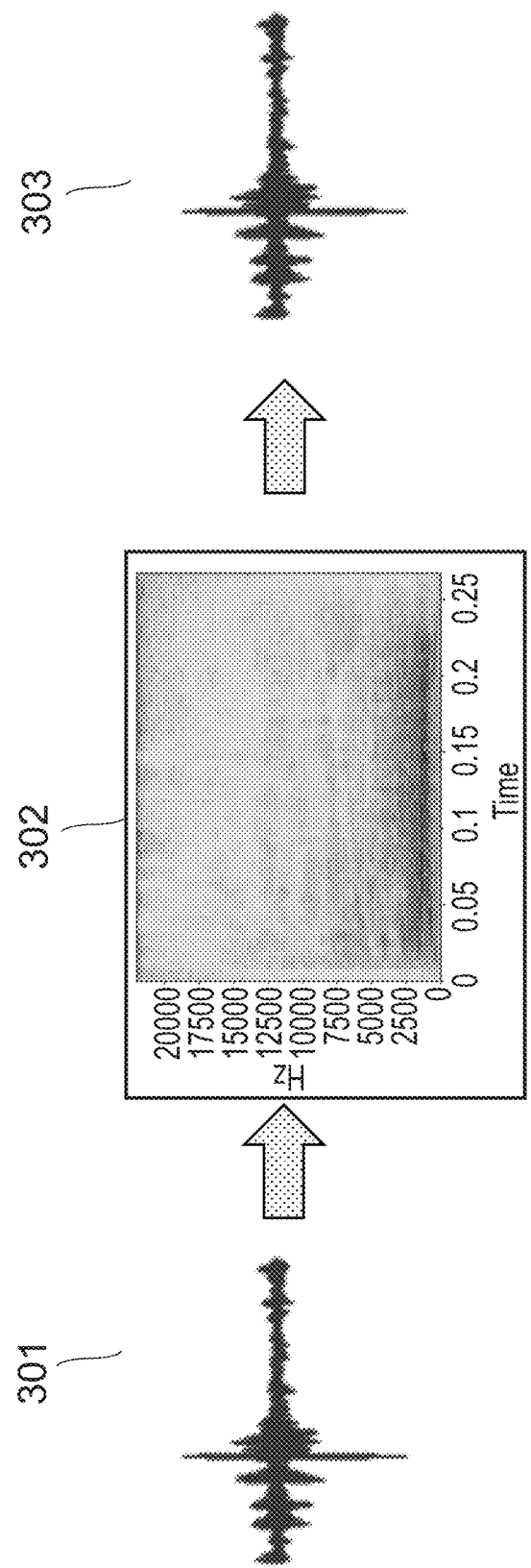
FIG. 3 schematically illustrates an example workflow of conversion between acoustic and visual forms according to an aspect of the disclosure.

In this example, the input audio asset is converted into an input spectrogram, which graphically represents audio information by plotting audio frequency and amplitude against time. An example process for converting the input audio asset into an input spectrogram is schematically illustrated in FIG. 3. The mono audio sample 301 is an audio file having a time duration L and a dimension 1×L, and represents an example audio asset. A transform operation is carried out on the audio sample 301 to convert from an acoustic form to a graphical representation—in this case to a single-channel spectrogram. In this example, a short-time Fourier transform (STFT) is performed to convert the audio sample 301 into a log-magnitude (log-mag) spectrogram 302 of dimensions 1×1×h×w. This spectrogram plots the frequency and amplitude of each frequency against the time duration of the sound. In the example shown, the axis denoting time duration is represented by the horizontal axis. Other Fourier forms and variations of the STFT can also be employed to achieve similar spectrograms. This spectrogram 302 can be converted back to an audio file by performing the inverse short-time Fourier transform (ISTFT) to retrieve a reconstructed audio sample 303. When applying the inverse transform to retrieve a reconstructed audio file, the Griffin-Lim algorithm can also be applied for example to reconstruct phase from a magnitude spectrogram, so that an inverse Fourier transform can be carried out with both phase and magnitude. Ideally, after the input 301 has been transformed into spectrogram form 302 and inverse transformed back to an audio form 303, the input audio 301 and reconstructed audio 303 should be identical—that is to say that there is no loss in the audio information when converting between the acoustic and visual forms.

The STFT technique generally illustrated in FIG. 3 is applied as part of step S202 to convert the input audio asset into a spectrogram. Whilst examples herein are exemplarily described with respect to image representations being spectrograms, other forms of representation are possible. However, the image representations typically have a form in which the time duration of the sound is somehow represented in the image. Typically, as is the case for spectrograms, the image has at least one axis which is representative of the time duration, with one or more other axes denoting the audio content, for example frequency and amplitude. In other words, the duration of the audio clip (length in time) is represented graphically by the dimension (length in space) of the image along the time axis. In the case of the spectrograms of FIG. 3, the width of the spectrogram along the horizontal axis denotes the relative length of the audio clip. A shorter sound clip would have a narrower spectrogram, and a longer sound clip would have a wider spectrogram.

If multiple audio files have been received in step S201, then they can be each separately converted to spectrogram (or image) form and combined in this step. For example, an input multi-channel image can be generated by stacking each input spectrogram in a separate channel of the multi-channel image. In some examples, the input spectrograms can be grouped into separate multi-channel images to create a plurality of input multi-channel images. Multiple input spectrograms can be stacked together to form a multi-channel image, with each input spectrogram being assigned a different channel in the multi-channel image. A simple example for an input batch of three input audio files can be illustrated using an RGB image. Each of the single-channel spectrograms for the three input assets (or layers) can be placed in a separate channel: a first spectrogram in the Red channel, a second spectrogram in the Green channel and a third spectrogram in the Blue channel to generate an RGB (three-channel) image comprising each spectrogram stacked in separate channels. The concept can be extended to any number of spectrograms stacked in any number of channels of a multi-channel image.

In the context of the present disclosure, each input spectrogram may be a single—channel image—typical of spectrograms which display either one of the magnitude or complex representation of the Fourier transform. In other examples, however, the input spectrograms may themselves be multi-channel images: for example, dual-channel images if both magnitude and phase are selected. The number of channels in the input audio file can also influence the number of channels of the spectrogram.

Step 203: Train a Generative Model on the Input Image and Implement the Trained Generative Model to Generate an Output Image.

The image obtained after performing steps S201 and S202 is fed into a generative model typically configured to generate a new image which is a variation of the input image. The generative model (or the neural networks contained within) is trained on the image. The model is typically configured to generate an image which resembles a spectrogram similar to that of the input spectrogram. As already mentioned, the similarity or variability of the output spectrogram from the input spectrogram can be controlled via input control information received into the system. Any input control information received at step S201 can be fed through to the generative model in this step, so as to affect the performance and output of the generative model in generating the output spectrogram. Such input control information can be input during training of a fresh generative model, or during implementation of an already trained model.

The generative model used in this step is typically a single image generative model. Such generative models typically comprise a generative adversarial network (GAN) with one or more generator neural network and one or more discriminator network. The discriminator network in such a model typically takes generated patch images received from the generator network and discriminates for loss of structure at the scale of small image patches within the larger image and classifies each patch (e.g. true/false) convolutionally across the whole image, averaging all responses to provide the overall output of the discriminator. Examples of single-image generative models include the SinGAN and the ConSinGAN. Such generative models are particularly suitable for the methods and systems described herein, because they can take only a single image as training data and use a patch discriminator to generate images of an arbitrary size once trained. Whilst the invention is generally described using a single-image generative model, the batch processing method can be applied to audio generation using other generative techniques, incorporating models such as variational autoencoders (VAE), auto-regressive models, and other neural network and GAN techniques.

Once trained on the input image, the generative network can be implemented to generate a new image.

The trained generative model generates a new image that is similar to the training input—i.e., the input audio asset—but which differs in one or more aspects. The differences in the image ultimately lead to a difference in duration of the sound which is represented by the image.

As already noted, the image representation used in the present invention typically have at least one feature which is indicative of the time duration of the audio it represents. The typical spectrogram has a time axis (typically along the horizontal axis of the image) which represents the time elapsed, against which frequency-amplitude plots are plotted representing the various sounds at various point in time during the clip. The dimension of the spectrogram along the time axis typically represents the relative length in time of the related audio clip. By taking an input spectrogram and generating a new version which has a different dimension along the time axis, it is possible to generate a new spectrogram which represents a new audio clip having a different time duration.

There are various approaches that can be taken to generate a new image with a different dimension along at least one axis. For example, the source image can be stretched, shrunk, duplicated, cropped, carved, scaled, or a completely newly generated random image can be appended. However, in order to retain the overall feel of the input audio asset, it is desirable to preserve important regions of the input spectrogram and minimise distortions, such that important features of the spectrogram (and therefore important features of the audio it represents) are still recognisably preserved. One way in which the generative network can be implemented is by retargeting the source training image. Such a process consists of modifying the image's aspect ratio and/or size, whilst maintaining important features and structures of the source image, to produce a new image which is similar in overall feel but with a new dimension along at least one axis. In some implementations, a preparatory step before image retargeting can comprise identifying important areas of the input spectrogram (or of the input audio asset) which must be preserved in the output spectrogram (or output audio asset). Such a determination can be made according to audio features, for example by selecting sounds in the input audio asset which have a high volume, signified for example by a region in the spectrogram of high amplitude (or above a threshold value). The input spectrogram can then be retargeted using machine learning techniques with the trained generative model, to generate a new spectrogram which is, for example, wider in dimension along the horizontal axis (representing the time dimension in this case) but which includes the important features of the input audio asset. The effect of such a 'widening' of the spectrogram is that the audio which it represents—once inverse Fourier transform is applied—is longer in duration, without undesirable stretching out of tones or loss of important detail. Although the aim is typically to produce a new audio asset having a new duration, the input spectrogram can be retargeted along an axis that is different to the time axis, alternatively or in combination with retargeting along the time axis.

In case input control information has been received in step 201 (or at any prior step), then this information can be fed to the generative model to control aspects of the output image. The input control information can be fed to the generator of the GAN to influence the way in which the generator generates the image or patch images. The input control information can for example first be converted into a noise vector and that vector used as an input noise vector into the generator. Alternatively, or in combination, the input control information can be fed into the discriminator for example to influence the way in which it calculates (and/or outputs) the loss score at each step. This technique can be applied to pre-trained networks and generative models, by loading a trained model stored on a memory and inputting the control information when generating new audio using that model. The input control information may for example include information indicative of important features in the input audio asset, which assists in retargeting the input image so that the selected features can be preserved or modified by a selected variation. This can be useful for example when using pre-trained networks, such that different areas of the input audio asset can be selected when necessary.

In case multiple input images have been batched together for example in a multi-channel image, the generative network can be trained on the input multi-channel image and be implemented in the corresponding manner as described above to generate a new output multi-channel image. Such an approach provides batch processing to generate multiple new sounds. Each channel of the multi-channel image contains a spectrogram representing an output layer; that is, a spectrogram representative of an audio asset which constitutes one layer of a multi-layered sound asset. In some examples, an output layer can be represented by multiple spectrograms—for example when multi-channel spectrogram representation is used.

Any output images obtained in this step can be sent to and stored in a memory unit, for long-term storage or random access. Such a form of storing the outputs of this method can provide a compressed file size, until the audio form is needed when step S204 can be performed to retrieve the output audio files.

Step 204: Generate an Output Audio Asset Based on the Output Image.

The output spectrogram can be converted into an audio file by performing an inverse transform, for example the ISTFT. The inverse transform converts each one of the output spectrograms from a visual or graphical representation into an audio file. The result is that the output image is converted into a newly generated audio file. The audio file can be sent to and stored in a memory unit, for long-term storage or random access, or they can be sent on and processed for immediate use—e.g. to be played in a video game environment.

Where multiple audio files have been processed and a new output multi-channel image has been generated, a single-channel image is extracted from each channel of the multi-channel image to obtain a plurality of output spectrograms. For example, if the output multi-channel image comprises three channels, then a simple one-to-one extraction results in the retrieval of three single-channel spectrograms. In the case that the input spectrograms were multi-channel spectrograms, then the grayscale images from several channels of the output multi-channel image may be combined to form the output spectrograms. For example, where the input spectrograms were two-channel spectrograms, then single-channel images from pairs of channels in the output multi-channel image can be combined to form the output spectrograms. Once the individual output spectrograms have been extracted, each of the spectrograms can be converted into an audio file by performing an inverse Fourier transform, such as the ISTFT.

In this step, a multi-layered sound can also be generated, particularly when multiple audio assets are taken in as input. By a 'multi-layered audio asset' it is intended to mean an audio asset which comprises two or more sounds stacked together to achieve a combined sound. Each of the individual sounds which are stacked together in a multi-layered audio asset can be referred to as a layer. Often, the layers which are stacked together are similar kinds of sounds which are combined to affect a more powerful or interesting outcome than each of the layers in isolation. The two or more individual sounds can be played simultaneously or with a stagger—that is, with a time delay between the start times of each sound. The time delay can be regular, meaning that the interval between each layer is equal; or the time delay can be irregular such that each interval is different with some layers optionally being played together with others. Sometimes a multi-layered audio asset can be referred to simply as a layered audio asset or a layered sound.

From the output layers derived from the output spectrograms, a layered sound can be generated in this step. The audio clips obtained by converting each of the output spectrograms in this step can be layered together to generate a layered sound file. The audio clips can be simply stacked on top of each other to be played back simultaneously, or in other cases, all or some of the clips can be offset in time so as to have a delayed playback. The delay between the clips in such a layered sound can be variable or pre-determined. For example, in the case of a footstep, the input sound assets (training sounds) could comprise: (i) a sound of the heel hitting the ground, (ii) a sound of the tip of the foot hitting the ground, and (iii) foley sounds. A generative model trained on the above input sound assets could output new heel, tip and foley sounds, each of which can be combined in a layered sound to generate a new overall footstep sound asset. As the heel typically hits the ground first, the layered sound could have the tip sound delayed after the heel sound (but overlapping in duration), and similarly with the foley sound.

Other aspects of the layers can also be adjusted at this step, when combining to form the output multi-layered audio asset. For example, the respective volume of one or more of the layers can be adjusted in relation to one or more other layers. Such adjustments can be made directly in response to external conditioning factors such as video game data as described herein.

Aspects of the output multi-layered audio asset, including acoustic properties of the layers (e.g. relative volume, tone) and arrangement of the layers (e.g. delay between layers, the sequence/order of layers), can be directly or indirectly linked to the respective aspects of the input audio assets. In some examples, acoustic and arrangement properties of the input layers in the input audio assets are first determined (for example in step 201) and stored such that when the output layers are generated from the output images in the output multichannel image, they can be arranged and adjusted according to the aspects read in from the input asset. The output layers can also be adjusted and/or arranged in response to further input, for example from video game environment.

Once trained, the generative model used can be stored and used 'offline' for generating new sounds. Whilst the process of training a single image generative model can take some time, once the model is trained, generating a new sound from that model can be done very quickly. Accordingly, a generative model can be trained for a certain sound or type of sounds and stored on a memory where it can be accessed to quickly generate new sounds similar to the training sound(s). For example, a generative model can be trained in the manner described herein on one or more training sounds of a footstep. That 'footstep model' can then be stored and used for example in a video game context: each time a character in a video game moves around (for example in response to user input control), a new footstep sound can be generated from the model and played back accordingly, so as to provide slightly different footstep sounds each time the character takes a step. Events in the video game environment can trigger a signal to the generative model to generate a new sound of a certain type. Multiple different generative models may be stored on a memory or processor for generating all sorts of different sounds. Where an 'offline' generative model is to be used for generating new sounds, the signal to request generation of a new sound could comprise information about the desired length of the new sound. Similarly, if the output sound is a layered audio file, the request could comprise information about the delay or temporal positioning of the sound layers. For example, in the case of a layered footstep sound, the duration of the overall sound and delay between the heel sound and tip sound could depend on how fast a character is moving in a video game environment. If the generative model is responsive to conditioning, further data such as video game data can be sent to the trained generative model to influence the result in the manner described herein.

Figure 4:
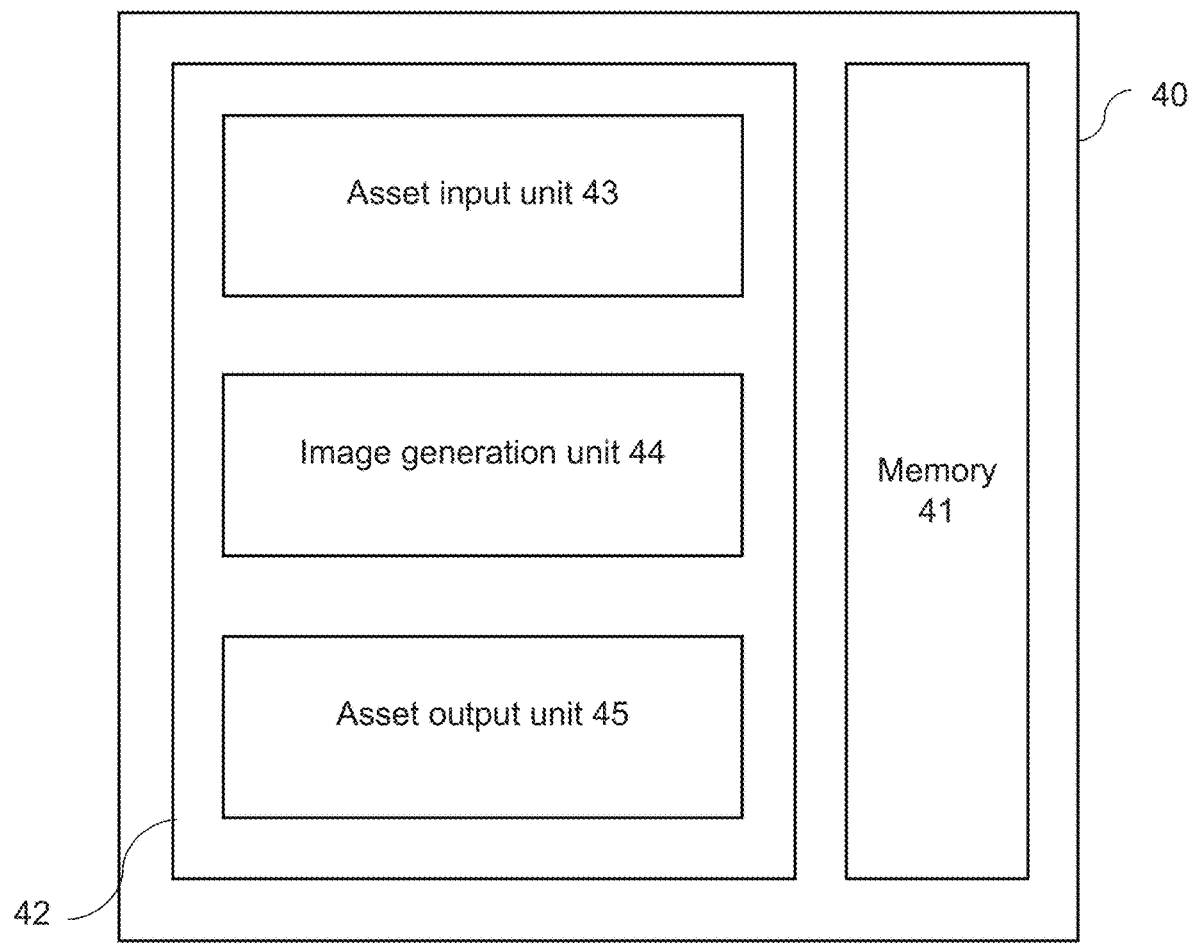
FIG. 4 schematically illustrates an example system in accordance with an aspect of the disclosure.

An aspect of the disclosure further provides a system, a schematic illustration of which is shown in FIG. 4. The system 40 comprises a memory 41, an asset input unit 43, an image generation unit 44 and an asset output unit 45. Each of the asset input unit 43, image generation unit 44 and asset output unit 45 may be located on a single processor, or located on separate processors. Alternatively, the units may be located remote on a separate memory and accessed (and operated) by a processor connected to the main memory. In this example, each of the units are located on the processor 42.

The asset input unit 43 is configured to receive an input audio asset in the manner described with respect to step S201, and to generate an input image in the manner described with respect to step S202. The image generation unit 44 is configured to receive the input image from the asset input unit 43 and access a generative model to generate new images based on the input image. Typically, this means that the image generation unit 44 is configured to train a single image generative model on the input image, and to apply the trained generative model, typically a neural-network-based machine learning model to generate new images in the manner described with respect to step S203. Alternatively, the image generation can be configured to access and implement an already trained ('pre-trained') generative model. Through implementation of such a generative model, the image generation unit 44 generates an output image (i.e., graphical representation). The output image corresponds to an output audio asset. The asset output unit 45 is configured to receive the output image from the image generation unit 44 and to convert the image into an output audio asset to form an output audio asset, in the manner as described in reference to step S204.

In some examples, the system can further include a Fourier transform unit, accessed by either or both of the asset input unit 43 and asset output unit 45, for converting between audio asset and graphical representation (image) formats. The Fourier transform unit is configured to carry out a Fourier transform operation (such as the STFT) on an audio asset to convert the audio file into a graphical representation such as a spectrogram, and is also configured to carry out an inverse Fourier transform operation (such as the ISTFT) to convert a spectrogram for example from a graphical representation to an audio asset.

In some examples, the system can further include a video game data processing unit. Such a video game data processing unit is configured to process data derived from (or relating to) a video game environment and to feed that data to one or more of the asset input unit, the image generation unit and the asset output unit. In one example, the video game data processing unit generates video game information based on a virtual environment and passes the video game information to the image generation unit 44. The image generation unit then implements the generative model using the video game information as one of the inputs, for example by using the video game information as a conditional input to the generative model being used. In other examples, the video game data processing unit simply receives video game information from a separate video game processor and passes the video game information to one or more of the other units in the system.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating audio assets, comprising the steps of:
   receiving an input audio asset having a first duration,
   generating an input image representative of the input audio asset,
   training a generative model on the input image and implementing the trained generative model to generate an output image representative of an output audio asset having a second duration different to the first duration, and
   generating the output audio asset based on the output image,
   wherein the input image and output image each comprise an axis representative of time duration, and the step of generating an output image comprises retargeting the input image along the axis representative of time duration, and
   wherein the output image has a larger dimension along the axis representative of time duration than the input image.

2. A method according to claim 1, wherein the output image has a dimension along the axis representative of time duration which is multiplied by a scale factor.

3. A method according to claim 1, wherein the input image is an input spectrogram, and the output image is an output spectrogram.

4. The method according to claim 3, wherein the step of generating an input image comprises performing a Fourier transform on the input audio asset, and the step of generating the output audio asset comprises performing an inverse Fourier transform on the output image.

5. The method according to claim 1, wherein the generative model is a single-image generative model comprising a generative adversarial network, GAN, having a generator and a patch discriminator.

6. A method according to claim 1, wherein the step of receiving an input audio asset comprises receiving, from a video game environment, video game information, and the step of generating the output image comprises feeding the video game information into the generative model such that the output image is influenced by the video game information.

7. A method according to claim 1, further comprising the step of storing the trained generative model on a memory, configured to be accessed to generate further audio assets.

8. A method according to claim 1, wherein the step of receiving an input audio asset comprises receiving a second input audio asset, and the step of generating an input image comprises generating a multi-channel image, comprising a first channel having an image representative of the input audio asset, and a second channel having an image representative of the second input audio asset.

9. A non-transitory computer-readable medium having stored thereon a computer program comprising computer-implemented instructions that, when run on a computer, cause the computer to implement a method of generating audio assets, comprising the steps of:
   receiving an input audio asset having a first duration,
   generating an input image representative of the input audio asset,
   training a generative model on the input image and implementing the trained generative model to generate an output image representative of an output audio asset having a second duration different to the first duration, and
   generating the output audio asset based on the output image,
   wherein the input image and output image each comprise an axis representative of time duration, and the step of generating an output image comprises retargeting the input image along the axis representative of time duration, and
   wherein the output image has a larger dimension along the axis representative of time duration than the input image.

10. A system for generating audio assets, the system comprising:
    an asset input unit configured to receive an input audio asset having a first duration, and to convert the input audio asset into an input image,
    an image generation unit configured to implement a generative model to generate one or more output images based on the input image, the output image representing an output audio asset having a second duration different to the first duration, and
    an asset output unit configured to generate an output audio asset based on the output image,
    wherein the input image and output image each comprise an axis representative of time duration, and the step of generating an output image comprises retargeting the input image along the axis representative of time duration, and
    wherein the output image has a larger dimension along the axis representative of time duration than the input image.

11. A system according to claim 10, further comprising a transform unit configured to perform Fourier transform operations and inverse Fourier transform operations to convert between audio and graphical files, and wherein
    the asset input unit is configured to access the transform unit to convert the input audio asset into an input image, and
    the asset output unit is configured to access the transform unit to convert each output image into an output audio asset.

12. A system according to claim 10, further comprising a video game data processing unit, configured to process video game information derived from or relating to a video game environment and feed through to one or more of the asset input unit, the image generation unit and the asset output unit, and the image generation unit is configured to implement the generative model based at least in part on the video game information.

13. A system according to claim 10, configured to store the generative model on the memory.

* * * * *